(12) United States Patent
Nishiguchi et al.

(10) Patent No.: US 6,660,385 B2
(45) Date of Patent: Dec. 9, 2003

(54) CATIONIC PAINT COMPOSITION

(75) Inventors: Shigeo Nishiguchi, Hiratsuka (JP); Koji Kamikado, Yokohama (JP); Susumu Midogochi, Hiratsuka (JP); Akira Tominaga, Chigasaki (JP)

(73) Assignee: Kansai Paint Co., Ltd., Hyogo-Ken (JP)

( * ) Notice: Subject to any disclaimer, the term of this patent is extended or adjusted under 35 U.S.C. 154(b) by 58 days.

(21) Appl. No.: 09/968,794

(22) Filed: Oct. 3, 2001

(65) Prior Publication Data
US 2002/0068172 A1 Jun. 6, 2002

(30) Foreign Application Priority Data
Oct. 11, 2000 (JP) ........................................ 2000-310658

(51) Int. Cl.$^7$ .......................... B32B 27/38; C08L 63/00; C25D 9/00
(52) U.S. Cl. ........................ 428/413; 428/418; 525/423; 525/438; 528/111; 528/114; 528/121; 205/316
(58) Field of Search ................................. 428/413, 414, 428/415, 416, 417, 418; 525/423, 438; 528/111, 114, 121; 205/316

(56) References Cited

U.S. PATENT DOCUMENTS

| 4,396,649 A | 8/1983 | Bailey et al. |
| 5,095,051 A | 3/1992 | Chung et al. |
| 5,298,148 A | 3/1994 | Yasuoka et al. |
| 6,503,629 B2 * | 1/2003 | Nishiguchi et al. .......... 428/413 |

FOREIGN PATENT DOCUMENTS

EP   1 111 013   6/2001

* cited by examiner

Primary Examiner—Robert Dawson
Assistant Examiner—Michael J Feely
(74) Attorney, Agent, or Firm—Wenderoth, Lind & Ponack, L.L.P.

(57) ABSTRACT

The present invention provides a cationic paint composition containing as resin component a polyol-modified amino group-containing epoxy resin obtained by reacting an epoxy resin with epoxy equivalent 180–2500 with a alkyl phenol and/or a carboxylic acid; a polyol obtained by adding a caprolactone to a compound containing a plurality of active hydrogen groups and an amino group-containing compound.

29 Claims, 1 Drawing Sheet

Fig. 1

4-SHEET BOX THROWING POWER (A)

REVERSE SIDES OF A, C, E, G ARE B, D, F, H (B)

CATIONIC PAINT COMPOSITION

DETAILED DESCRIPTION OF THE INVENTION

The present invention relates to a cationic paint composition and more specifically relates to a cationic electrodeposition paint composition capable of forming a cured coating film excellent in performances such as throwing power, rust preventive steel plate aptitude etc.

Cationic electrodeposition paint composition has been used mainly for undercoating of a car body as an electrodeposition paint and other wide range of applications and products having various properties have been developed up to now. For example, there has been proposed a cationic electrodeposition paint composition which contains a base resin containing an epoxy resin, which contains amino group and/or quaternary ammonium group as water-solubilizing group and is internally plasticized with a plasticizer such as polyamide, polyester, polyether etc., and is excellent in corrosion resistance and good in rust preventive steel plate aptitude and adhesion. In such a cationic electrodeposition paint composition there are compounded lead compounds or chromium compounds, for example, lead chromate, basic lead silicate, strontium chromate etc. as anticorrosive pigment. Recently, however, the use of such harmful compounds as lead compounds or chromium compounds is restricted in terms of pollution problems and the development of a cationic paint composition, excellent in corrosion resistance without compounding lead compounds or chromium compounds, has been strongly desired.

As an epoxy resin which is internally plasticized with a plasticizer tends to deteriorate the corrosion resistance of the coating film, it may be considered to improve the corrosion resistance by using as base resin an epoxy resin without containing a plasticizing modifier. There is, however, a problem that a paint composition using a non-plasticized epoxy resin has a lower rust preventive steel plate aptitude.

Moreover, it has been proposed to compound to an epoxy resin a plasticizer which does not deteriorate the corrosion resistance of the coating film, for example, polyol resin such as polyester polyol, polyether polyol, polyurethane polyol, acrylpolyol etc.; polyolefin such as polybutadiene, polyethylene etc. There are problems, however, that these materials are not compatible enough with epoxy resin and are not only poorly effective to improve the rust preventive steel plate aptitude but also deteriorate the corrosion resistance of the coating film if compounded much.

On the other hand, a throwing power is required to a cationic electrodeposition paint composition as a rust preventive countermeasure for baggy parts of a car body (locker, side-sill, pillar) etc. Particularly recently a higher throwing power is required to a cationic electrodeposition paint composition because of more complicated body structure, such as putting reinforcement to the locker part and in the side-sill from levelling up of car safety level. Therefore it has been desired to develop a cationic electrodeposition paint composition having a high throwing power, excellent in corrosion resistance and rust preventive steel plate aptitude.

The present inventors repeated intensive research works to respond to the above-mentioned requirements. As a result, this time, they have found out that a cationic electrodeposition paint composition having not only a high throwing power but also excellent in rust preventive steel plate aptitude and corrosion resistance by compounding a certain specific kind of a polyol-modified amino group-containing epoxy resin in a cationic electrodeposition paint.

Thus, according to the present invention there is provided a cationic paint composition containing as resin component a polyol-modified amino group-containing epoxy resin obtained by reacting (a) an epoxy resin with an epoxy equivalent of 180–2,500 with (b) an acid compound selected from the group consisting of the phenols of the following formula (1) and the carboxylic acids of the following formula (2), wherein,
X represents a hydrogen atom or a hydrocarbon group with a carbon atom number 1–15 which may have optionally substituents selected from the group consisting of —OH, —OR, —SH and —SR,
Y represents a hydrocarbon group with a carbon atom number 1–15 which may have optionally substituents selected from the group consisting of —OH, —OR, —SH and —SR,
wherein R represents an alkyl group.

(c) a polyol compound obtained from a compound ($c_1$) containing a plurality of active hydrogen groups by adding a caprolactone ($c_2$) and (d) an amino group-containing compound.

Then, the cationic paint composition provided by the present invention will be described in more detail.

(a) Epoxy resin:

As an epoxy resin (a) to be the main skeleton of the polyol-modified amino group-containing epoxy resin according to the present invention it is suitable to have an epoxy equivalent in the range of 180–2,500, preferably 200–2,000 and more preferably 400–1,500 and a number-average molecular weight of generally at least 200, preferably in the range of 400–4,000 and more preferably 800–2,500. If the epoxy equivalent of the epoxy resin is less than 180, the corrosion resistance and throwing power of the formed cationic paint composition is poor. If, on the other hand, it is more than 2,500, the rust preventive steel plate (zinc-plated steel plate) aptitude is remarkably deteriorated, As such an epoxy resin (a), a product obtained by reacting a polyphenol compound with an epihalohydrin, for example, epichlorohydrin, is preferable from a viewpoint of corrosion resistance etc. of the coating film.

As a polyphenol compound usable for the formation of said polyepoxide compound there can be mentioned, for example, bis(4-hydroxyphenyl)-2,2-propane (bisphenol A), 4,4-dihydroxybenzophenone, bis(4-hydroxyphenyl) methane (bisphenol F), bis(4-hydroxy-phenyl)-1,1-ethane, bis(4-hydroxyphenyl)-1,1-isobutane, bis(4-hydroxy-tert-butyl-phenyl)-2,2-propane, bis(2-hydroxynaphthyl)-methane, tetra(4-hydroxyphenyl)-1,1,2,2-ethane, 4,4-dihydroxy-diphenylsulfone, phenol novolac, cresol novolac etc.

As an epoxy resin obtained by the reaction of polyphenol compound and epichlorohydrin, above all, a product derived from bisphenol A and illustrated by the following formula wherein n=1–3 is preferable.

As such an epoxy resin available on the market, there can be mentioned, for example, products sold by Japan Epoxy Resin Co., Ltd. under the trade name of Epicote 828EL, 1002, 1004 and 1007.

(b) Acid compound:

Acid compound to be reacted with the above-mentioned epoxy resin (a) according to the present invention is at least one kind of compound selected from the group consisting of the phenols illustrated by the following formula (1)

(1)

wherein
 X represents a hydrogen atom or a hydrocarbon group with a carbon atom number 1–15 which may have optionally substituents selected from the group consisting of —OH, —OR, —SH and —SR, wherein R represents an alkyl group, and
the carboxylic acids illustrated by the following formula (2)

(2)

wherein
 Y represents a hydrocarbon group with a carbon atom number 1–15 which may have optionally substituents selected from the group consisting of —OH, —OR, —SH and —SR, wherein R represents an alkyl group.

In the above-mentioned formula (1) the hydrocarbon group with a carbon atom number 1–15 represented by X can be straight chain, branched chain or cyclic and, above all, alkyl groups with a carbon atom number 1–15, particularly 1–12, for example, methyl, ethyl, n-propyl, isopropyl, n-butyl, tert-butyl, nonyl etc. are preferable. These groups may be substituted optionally with a group selected from the group consisting of hydroxyl group (—OH), alkoxy group (—OR), mercapto group (—SH) and alkylthio group (—SR).

As specific examples of the phenols of the above-mentioned formula (1) there can be mentioned, for example, phenol, cresol, ethylphenol, p-tert-butylphenol, nonylphenol etc. Particularly alkyl phenols are preferable.

In the above-mentioned formula (2) the hydrocarbon group with a carbon atom number 1–15 represented by Y can be straight chain, branched chain or cyclic and specifically includes, for example, alkyl groups such as methyl, ethyl, n-propyl, isopropyl, n-butyl, nonyl etc.; alkenyl groups such as vinyl, oleyl etc.; aryl groups such as phenyl. These groups may be substituted optionally with at least one, preferably 1–3 groups selected from the group consisting of hydroxyl group, alkoxy group, mercapto group and alkylthio group. As a hydrocarbon group substituted with such a group there can be mentioned, for example, 1-hydroxyethyl, 1,1-dimethylolethyl, 1,1-di-methylolpropyl, 3,4,5-trihydroxyphenyl etc.

As carboxylic acids of the above-mentioned formula (2) there can be mentioned, for example, acetic acid, propionic acid, butyric acid, valeric acid, acrylic acid, oleic acid, glycolic acid, glyceric acid, lactic acid, dimethylolpropionic acid, dimethylolbutyric acid, dimethylolvaleric acid, benzoic acid, gallic acid etc. Above all, acetic acid, propionic acid, butyric acid, oleic acid, dimethylolpropionic acid, dimethylolbutyric acid, dimethylolvaleric acid and benzoic acid are preferable.

(c) Polyol compound:

In the present invention a polyol compound (c) is useful to internal plasticization of the aforementioned epoxy resin (a) and prepared by adding a caprolactone ($c_2$) to a compound ($c_1$) containing a plurality of active hydrogen groups.

Active hydrogen group means a group containing at least one active hydrogen atom and includes, for example, alcoholic hydroxyl group, primary amino group, secondary amino group etc. As such compounds (cl) containing a plurality of active hydrogen groups in the molecule there can be mentioned, for example, (i) low molecular weight polyols,
(ii) linear or branched polyether polyols,
(iii) linear or branched polyester polyols,
(iv) amine compounds containing primary amino group and/or secondary amino group or hydroxyamine compounds containing, primary amino group and/or secondary amino group, and hydroxyl group, etc.

These active hydrogen group-containing compounds ($c_1$) may have a number-average molecular weight in the range of generally 62–5,000, preferably 62–4,000 and more preferably 62–1,500. An active hydrogen group-containing compound ($c_1$) is preferable, when it contains, as an average, at least 2 and less than 30, particularly 2–10 active hydrogen groups in the molecule.

The above-mentioned low molecular weight polyols (i) are compounds containing at least 2 alcoholic hydroxyl groups in the molecule and there can be specifically mentioned, for example, diols such as ethylene glycol, propylene glycol, 1,3-butylene glycol, 1,4-butanediol, 1,6-hexanediol, diethylene glycol, dipropylene glycol, cyclohexane-1,4-dimethylol, neopentyl glycol, triethylene glycol, hydrogenated bisphenol A etc.; triols such as glycerol, trimethylolethane, trimethylolpropane etc.; tetrols such as pentaerythritol, α-methylglycoside etc.; hexols such as sorbitol, dipentaerythritol etc.; octols such as sucrose etc.

The above-mentioned linear or branched polyether polyols (ii) may have a number-average molecular weight in the range of usually 62–10,000, preferably 62–2,000 and there can be specifically mentioned, for example, polyethylene glycol, polypropylene glycol, polytetramethylene glycol, poly(ethylene/propylene)glycol, bisphenol A polyethylene glycol ether, bisphenol A polypropylene glycol ether etc. prepared by ring-opening addition reaction of alkylene oxides (e.g., ethylene oxide, propylene oxide, butylene oxide, tetrahydro-furan etc.).

The above-mentioned linear or branched polyester polyols (iii) may have a number-average molecular weight in the range of usually 200–10,000, preferably 200–3,000 and there can be specifically mentioned, for example, products obtained by polycondensation reaction of organic dicarboxylic acid or its anhydride and organic diol under the condition of excess of organic diol. As an organic dicarboxylic acid used in this case there can be mentioned aliphatic, alicyclic or aromatic dicarboxylic acids of a carbon number 2–44, particularly 4–36, for example, succinic acid, adipic acid, azelaic acid, sebacic acid, maleic acid, fumaric acid, glutalic acid, hexachloroheptane dicarboxylic acid, cyclohexane dicarboxylic acid, o-phthalic acid, isophthalic acid, terephthalic acid, tetrahydrdophthalic acid, tetrachlorophthalic acid etc. Moreover, in addition to these dicarboxylic acids, small amount of anydride of polycarboxylic acid having more than 3 carboxyl groups, adducts of unsaturated fatty acids etc. can be used together.

As an organic diol component there can be mentioned, for example, alkylene glycols such as ethylene glycol, propylene glycol, butylene glycol, 1,4-butanediol, 1,6-hexanediol, neopentyl glycol etc., dimethylol cyclohexane etc. They may be used optionally together with small amount of polyol such as trimethylolpropane, glycerol, pentaerythritol etc.

As the above-mentioned amine compounds containing primary amino group and/or secondary amino group or hydroxy amine compounds (iv) containing primary amino group and/or secondary amino group, and hydroxyl group there can be mentioned, for example, alkylamines such as butylenediamine, hexamethylenediamine, tetraethylenepentamine, pentaethylenehexamine etc.; alkanolamines such as monoethanolamine, diethanolamine, triethanolamine, mono(2-hydroxypropyl)amine, di(2-hydroxypropyl)amine etc.; alicyclic polyamines such as 1,3-bisaminomethylcyclohexanone, isophoronediamine etc.; aromatic polyamines such as xylylenediamine, m-xylenediamine, diaminodiphenylmethane, phenylenediamine etc.; alkylenepolyamines such as ethylenediamine, propylenediamine, diethylenetriamine, triethylenetetramine etc.; other amine compounds such as piperazine and polyamide, polyamide amine, amine adduct with epoxy compound, ketimine, aldimine etc. derived from these polyamines.

Among the compounds ($c_1$) containing a plurality of active hydrogen groups mentioned above, compounds of the above-mentioned (i), (ii) and (iv), particularly compounds selected from the group consisting of ethylene glycol, propylene glycol, 1,4-butanediol, 1,6-hexanediol, diethylene glycol, hydrogenated bisphenol A, glycerol, trimethylolethane, trimethylolpropane, pentaerythritol, dipentaerythritol, polyethylene glycol, polypropylene glycol, polytetramethylene glycol, poly(ethylene/propylene) glycol, bisphenol A polyethylene glycol ether, bisphenol A polypropylene glycol ether, butylenediamine, hexamethylenediamine, monoethanolamine, diethanolamine, triethanolamine, isophoronediamine, ethylenediamine, propylenediamine, diethylenetriamine and triethylenetetramine are preferable.

On the other hand, as a caprolactone ($c_2$) capable of adding to a compound ($c_1$) containing a plurality of active hydrogen groups there can be mentioned γ-caprolactone, ε-caprolactone, δ-caprolactone etc. and particularly ε-caprolactone is preferable.

The above-mentioned addition reaction of a compound ($c_1$) containing a plurality of active hydrogen groups and a caprolactone ($c_2$) can be conducted by a per se known process. Specifically, for example, it can be conducted by heating a compound ($c_1$) containing a plurality of active hydrogen groups and a caprolactone ($c_2$) at about 100–about 250° C. for about 1–about 15 hours in the presence of a catalyst like titanium compound such as tetrabutoxy titanium, tetrapropoxy titanium etc.; organic tin compound such as tin octylate, dibutyltin oxide, dibutyltin laurate etc.; metal compound such as stannous chloride etc.

The above-mentioned catalyst can be used generally in an amount of 0.5–1,000 ppm based upon the total amount of the compound ($c_1$) containing a plurality of active hydrogen groups and caprolactone ($c_2$). A caprolactone ($c_2$) can be used in the range of generally 1–30 moles, preferably 1–20 moles and more preferably 1–15 moles to 1 equivalent of active hydrogen group (i.e. to 1 active hydrogen) of the compound ($c_1$) containing a plurality of active hydrogen groups.

The polyol compounds thus obtained (c) have a high plasticizing performance based upon the compound containing a plurality of active hydrogen groups ($c_1$), a high compatibility with epoxy resin based upon (poly) caprolactone and a high reactivity by terminal hydroxyl groups and are very useful as an internal plasticizer of an epoxy resin for paint.

Polyol compound (c) can contain the units derived from a caprolactone ($c_2$) in the range of generally 20–95% by weight, preferably 25–90% by weight as total and can have a number-average molecular weight in the range of generally 300–10,000, preferably 400–5,000.

(d) Amino group-containing compound:

An amino group-containing compound (d) to be reacted with the aforementioned epoxy resin (a) in the present invention is a component to give the cationicity to cationize said epoxy resin by introducing amino group to the epoxy resin substrate and there is used a compound containing at least one active hydrogen which reacts with an epoxy group.

As an amino group-containing compound used for such purpose there can be mentioned, for example, mono- or di-alkylamines such as monomethylamine, dimethylamine, monoethylamine, diethylamine, monoisopropylamine, diisopropylamine, triisopropylamine, monobutylamine, dibutylamine etc.; alkanolamines such as monoethanolamine, diethanolamine, mono(2-hydroxypropyl)amine, di(2-hydroxypropyl)amine, tri(2-hydroxypropyl)amine, monomethylaminoethanol, monoethylaminoethanol etc.; alkylenepolyamines such as ethylenediamine, propylenediamine, butylenediamine, hexa-methylenediamine, tetraethylenepentamine, pentaethylenehexamine, diethylaminopropylamine, diethylenetriamine, triethylenetetramine etc. and ketiminized products of these polyamines; alkyleneimines such as ethyleneimine, propyleneimine etc.; cyclic amines such as piperazine, morpholine, pyrazine etc.

Polyol-modified Amino Group-containing Epoxy Resin

Polyol-modified amino group-containing epoxy resin used as vehicle in the paint composition of the present invention can be prepared by reacting the aforementioned epoxy resin (a) with acid compound (b), polyol compound (c) having terminal hydroxyl group derived from caprolactone and amino group-containing compound (d) by a per se known process. Reactions of acid compound (b), polyol compound (c) and amino group-containing compound (d) to the epoxy resin (a) may be conducted in an optional order. Generally, however, it is preferable to react acid compound (b) to the epoxy resin (a) first and then to add polyol compound (c) and amino group-containing compound (d) to the reaction product at the same time. It is preferable that one terminal of the polyol compound (c) adds to the skeleton of the epoxy resin (a).

Reaction of an epoxy resin (a) and an acid compound (b) can be conducted usually in an appropriate solvent and optionally in the presence of a catalyst at usually about 60–about 250° C., preferably about 70° C.–about 200° C. for about 1–25 hours, preferably about 1–12 hours. As the above-mentioned solvent there can be mentioned, for example, hydrocarbons such as toluene, xylene, cyclohexane, n-hexane etc.; esters such as methyl acetate, ethyl acetate, butyl acetate etc.; ketones such as acetone, methyl ethyl ketone, methyl isobutyl ketone, methyl amyl ketone etc.; amides such as dimethylformamide, dimethylacetamide etc.; alcohols such as methanol, ethanol, n-propanol isopropanol etc.; and their mixtures. As a catalyst suitably used there can be mentioned, for example, titanium compounds such as tetrabutoxy titanium, tetrapropoxy titanium etc.; organic tin compound such as tin octylate, dibutyltin oxide, dibutyltin laurate etc.; metal compound such as stannous chloride etc.; organic amine compounds etc.

Thus a reaction product in which an acid compound (b) has added to the skeleton of the epoxy resin (a).

Addition reaction of a polyol compound (c) and an amino group-containing compound (d) to the reaction product can be conducted usually in an appropriate solvent as mentioned above at about 80–about 170° C., preferably about 90–about 150° C. for about 1–6 hours, preferably about 1–5 hours.

Ratio of usage of each reaction component in the above-mentioned reaction is not strictly limited but can be varied suitably according to the application of the paint composition etc. The following ranges, however, based upon the total solid content weight of the 4 components, epoxy resin (a), acid compound (b), polyol compound (c) and amino group-containing compound (d), are appropriate.

epoxy resin (a):
  generally 60–85% by weight, preferably 62–83% by weight.
acid compound (b):
  generally 0.5–15% by weight, preferably 1–10% by weight.
polyol compound (c):
  generally 5–20% by weight, preferably 5–18% by weight. amino group-containing compound (d):
  generally 5–25% by weight, preferably 6–19% by weight.

The polyol-modified amino group-containing epoxy resin thus prepared can have an amine value in the range of usually 30–55 mgKOH/g, preferably 32–50 mgKOH/g.

Cationic Paint Composition

The cationic paint composition provided by the present invention contains a polyol-modified amino group-containing epoxy resin prepared as mentioned above as vehicle and is preferably used in water-borne paint, particularly electrodeposition paint.

The polyol-modified amino group-containing epoxy resin according to the present invention can prepare a thermosetting cationic paint composition by using a crosslinking agent, for example, blocked polyisocyanate, melamine resin etc., particularly blocked polyisocyanate crosslinking agent in combination.

The above-mentioned blocked polyisocyanate crosslinking agent is an addition reaction product of a polyisocyanate compound and an isocyanate-blocking agent to approximately stoichiometric amount. As a polyisocyanate compound used in this case there can be mentioned, for example, aromatic, alicyclic or aliphatic polyisocyanate compounds such as tolylene diisocyanate, xylylene diisocyanate, phenylene diisocyanate, bis(isocyanatomethyl)cyclohexane, tetramethylene diisocyanate, hexamethylene diisocyanate, methylene diisocyanate, isophoron diisocyanate, diphenylmethane-2,4'-diisocyanate, diphenylmethane-4,4'-diisocyanate, polymethylene polyphenyl polyisocyanate etc.; cyclization polymers of these polyisocyanates; isocyanate-biurets; compounds containing terminal isocyanate obtained by reacting an excess amount of these isocyanate compounds with a low molecular active hydrogen-containing compound such as ethylene glycol, trimethylolpropane, hexanetriol, castor oil etc., etc. They can be used singly or in mixing 2 kinds or more.

Among them, particularly aromatic diisocyanates, above all, crude MDI is preferable.

Crude MDI is a mixture of diphenylmethane-4,4'-diisocyanate, diphenylmethane-2,4'-diisocyanate and polymethylene polyphenyl polyisocyanate as main components and there can be mentioned as commercial products Cosmonate M-50, M-200, M-100, M-300 etc. (made by Mitsui Chemicals, Inc.); Sumidur 44V10, 44V20, 44V40 etc. (made by Sumika Bayer Urethane Co., Ltd.); Lupranate M-12, M-12S, M-20, M-20S etc. (made by BASF, Germany); Mondur MR (LIGHT) etc. (made by Bayer) etc.

On the other hand, the aforementioned isocyanate blocking agent is a substance to be added to an isocyanate group of a polyisocyanate compound and to block it and the blocked polyisocyanate compound formed by the addition is desirably stable at normal temperature and capable of reproducing a free isocyanate group, dissociating the blocking agent, at the time of being heated to a baking temperature (usually about 100–about 200° C.) of the coating film. As a blocking agent meeting such requirements there can be mentioned, for example, lactam type compounds such as ε-caprolactam, γ-butyrolatam etc.; oxime type compounds such as methyl ethyl ketoxime, cyclohexanone oxime etc.; phenol type compounds such as phenol, p-t-butylphenol cresol etc.; aliphatic alcohols such as n-butanol, 2-ethylhexanol etc.; aromatic alkyl alcohols such as phenylcarbinol, methylphenylcarbinol etc.; ether alcohol type compounds such as ethylene glycol monobutyl ether, diethylene glycol monoethyl ether etc.

Compounding ratio of a polyol-modified amino group-containing epoxy resin and a blocked polyisocyanate crosslinking agent can be in the range of genarally 55–90% by weight, preferably 60–85% by weight and more preferably 60–80% by weight of the polyol-modified amino group-containing epoxy resin and genarally 10–45% by weight, preferably 15–40% by weight and more preferably 20–40% by weight of the blocked polyisocyanate crosslinking agent based upon the total solid content weight of both components.

The cationic paint composition of the present invention containing the above-mentioned polyol-modified amino group-containing epoxy resin and a blocked polyisocyanate crosslinking agent can be prepared, for example, by sufficiently mixing the polyol-modified amino group-containing epoxy resin and the blocked polyisocyanate crosslinking agent and then water-solubilization or water-dispersing said epoxy resin through neutralization with a water-soluble organic carboxylic acid usually in an aqueous medium. As an organic carboxylic acid for neutralization particularly acetic acid, formic acid or their mixture are preferable. By using these acids finishing property, throwing power and low temperature curability of the formed paint composition and stability of the paint are improved.

In the paint composition of the present invention a bismuth muth compound can be contained as anticorrosive agent. There is no restriction in the kind of bismuth compound to be compounded and there can be mentioned, for example, inorganic bismuth compounds such as bismuth oxide, bismuth hydroxide, basic bismuth carbonate, bismuth nitrate, bismuth silicate etc. Among them particularly bismuth hydroxide is preferable.

Moreover, it is possible to use, as a bismuth compound, an organic bismuth salt which is prepared by reacting a bismuth compound as mentioned above and more than 2 kinds of organic acids, at least one of which is an aliphatic hydroxycarboxylic acid. As an organic acid usable for the preparation of said organic bismuth salt there can be mentioned, for example, glycolic acid, glyceric acid, lactic acid, dimethylolpropionic acid, dimethylolbutyric acid, dimethylolvaleric acid, tartaric acid, malic acid, hydroxymalonic acid, dihydroxysuccinic acid, trihydroxysuccinic acid, methylmalonic acid, benzoic acid, citric acid etc.

The above-mentioned inorganic bismuth compounds and organic bismuth salts can be used each singly or in combination of more than 2 kinds.

Content of these bismuth compounds in the paint composition of the present invention is not strictly limited but can be varied in a wide range according to the performances required to the paint etc. Usually, however, less than 10% by weight, preferably the range of 0.05–5% by weight, based upon the resin solid content in the paint composition of the present invention, is appropriate.

The cationic paint composition of the present invention can further contain, optionally, a tin compound as a curing catalyst. As said tin compound there can be mentioned, for example, organotin compounds such as dibutyltin oxide, dioctyltin oxide etc.; aliphatic or aromatic carboxylates of dialkyltin such as dibutyltin dilaurate, dioctyltin dilaurate, dibutyltin diacetate, dioctyltin dibenzoate, dibutyltin dibenzoate etc. Among them, dialkyltin aromatic carboxylates etc. are preferable from the viewpoint of low temperature curability.

The content of such a tin compound in the paint composition of the present invention is not strictly prescribed but can be varied in a wide range according to the performances required to the paint etc. The tin content, however, is preferably in the range of usually 0.01–8 parts by weight, preferably 0.05–5.0 parts by weight per 100 parts by weight of the resin solid content in the paint.

In the cationic paint composition of the present invention there can be further compounded, as necessary, additives for paint such as color pigment, extender pigment, anticorrosive pigment, organic solvent, pigment dispersing agent, surface adjustment agent etc.

The cationic paint composition of the present invention can coat the surface of a desired substrate by cationic electrodeposition coating. The electrodeposition coating can be conducted generally in an electrodeposition bath comprising the paint composition of the present invention diluted with deionized water etc. to the solid content concentration of about 5–about 40% by weight, preferably 15–25% by weight and adjusted its pH in the range of 5.5–9 under the condition of the bath temperature usually adjusted to about 15–about 35° C. and the load voltage of 100–450V.

The film thickness of the electrodeposition coating film formed by using the paint composition of the present invention is not particularly limited but is preferable generally in the range of 10–45 μm, particularly 15–30 μm based upon a cured coating film. The baking temperature of the coating film is suitable generally in the range of about 120–about 200° C., preferably about 140–about 180° C. at the surface of the substrate. The baking time can be about 5–60 minutes, preferably about 10–30 minutes.

The cationic paint composition of the present invention can be used preferably as cationic electrodeposition paint. Besides it can also be used as solvent type paint as an anticorrosive primer for a steel plate to be coated by means of electrostatic coating, roller coating etc.

Furthermore, the paint composition of the present invention can be used as two liquid type room temperature-drying paint using polyisocyanate compound or melamine resin as crosslinking agent or adhesive.

The cationic paint composition of the present invention forms a cured coating film excellent in corrosion resistance, rust preventive steel plate aptitude and adhesion to the substrate and is useful, for example, as undercoat paint for car body, car parts, in the field of construction and architecture etc.

Especially, to a cationic electrodeposition paint, a throwing power is required as a rust preventive countermeasure for baggy parts of a car body (locker, side-sill, pillar), and a higher throwing power is required because of more complicated body structure such as putting reinforcement to the locker part and in the side-sill from the recent levelling up of safety level.

The cationic paint composition of the present invention has a high throwing power and can form an electrodeposition coating film excellent in corrosion resistance with excellent electrodeposition coating aptitude even for a car body with complicated structure.

Then the present invention will be described more specifically by referring to examples. The present invention shall, however, not be restricted to these examples in any way. "Part" and "%" means "part by weight" and "% by weight", respectively.

PREPARATION EXAMPLE 1

Polyol-modified Amino Group-containing Epoxy Resin

After adding 300 g of ε-caprolactone to 400 g of PP-400 (polypropylene glycol, molecular weight 400, made by Sanyo Chemical Industries, Ltd., trade name) and heating to 130° C., 0.01 g of tetrabutoxy titanium was added and heated to 170° C. Keeping the temperature, the amount of unreacted ε-caprolactone was monitored by infrared absorption spectrum measurement of samples taken from time to time. When the reaction rate was more than 98%, the reaction mixture was cooled to obtain the modifier 1.

To 1000 g of Epicote 828EL (epoxy resin, epoxy equivalent 190, molecular weight 350, made by Japan Epoxy Resin Co., Ltd., trade name) 400 g of bisphenol A and 0.2 g of dimethylbenzylamine were added and reacted at 130° C. until epoxy equivalent became 750. 120 g of nonylphenol was added therein and reacted at 130° C. until epoxy equivalent became 1000. Then 200 g of the modifier 1, 95 g of diethanolamine and 65 g of ketiminized product of diethylenetriamine were added and reacted at 120° C. for 4 hours. After that 414 g of butyl cellosolve was added to obtain the resin No. 1 with amine value 40 and resin solid content 80%.

PREPARATION EXAMPLE 2

Polyol-modified Amino Group-containing Epoxy Resin

To 660 g of BPE-100 (bisphenol A polyethylene glycol, molecular weight 660, made by Sanyo Chemical Industries, Ltd, trade name) 400 g of ε-caprolactone was added and heated to 130° C. Then 0.01 g of tetrabutoxy titanium was added and heated to 170° C. Keeping the temperature, the amount of unreacted ε-caprolactone was monitored by infrared absorption spectrum measurement of samples taken from time to time. When the reaction rate was more than 98%, the reaction mixture was cooled to synthesize the modifier 2.

Then the resin No. 2 with amine value 40 and resin solid content 80% was obtained by the similar operation to Preparation Example 1 except using the modifier 2 instead of the modifier 1.

PREPARATION EXAMPLE 3

Polyol-modified Amino Group-containing Epoxy Resin

To 103 g of diethylenetriamine 697 g of ε-caprolactone was added and heated to 130° C. Then 0.01 g of tetrabutoxy titanium was added and heated to 170° C. Keeping the temperature, the amount of unreacted ε-caprolactone was monitored by infrared absorption spectrum measurement of samples taken from time to time. When the reaction rate was more than 98%, the reaction mixture was cooled to synthesize the modifier 3.

Then the resin No. 3 with amine value 40 and resin solid content 80% was obtained by the similar operation to Preparation Example 1 except using the modifier 3 instead of the modifier 1.

PREPARATION EXAMPLE 4

Polyol-modified Amino Group-containing Epoxy Resin

To 1000 g of Epicote 828EL (epoxy resin, epoxy equivalent 190, molecular weight 350, made by Japan Epoxy Resin Co., Ltd., trade name) 400 g of bisphenol A and 0.2 g of dimethylbenzylamine were added and reacted at 130° C. until epoxy equivalent became 750. 61 g of benzoic acid was added therein and reacted at 130° C. until epoxy equivalent became 1000. Then 200 g of the modifier 1, obtained in the same manner as in Preparation Example 1, 95 g of diethanolamine and 65 g of ketiminized product of diethylenetriamine were added and reacted at 120° C. for 4 hours. After that 400 g of butyl cellosolve was added to obtain the resin No. 4 with amine value 41 and resin solid content 80%.

PREPARATION EXAMPLE 5

To 1000 g of Epicote 828EL (epoxy resin, epoxy equivalent 190, molecular weight 350, made by Japan Epoxy Resin Co., Ltd., trade name) 400 g of bisphenol A and 0.2 g of dimethylbenzylamine were added and reacted at 130° C. until epoxy equivalent became 750. Then 200 g of the modifier 1, obtained in the same manner as in Preparation Example 1, 140 g of diethanolamine and 65 g of ketiminized product of diethylenetriamine were added and reacted at 120° C. for 4 hours. After that 400 g of butyl cellosolve was added to obtain the resin No. 5 with amine value 56 and resin solid content 80%.

PREPARATION EXAMPLE 6

To 1010 g of Epicote 828EL (epoxy resin made by Japan Epoxy Resin Co., Ltd., trade name) 390 g of bisphenol A and 0.2 g of dimethylbenzylamine were added and reacted at 130° C. until epoxy equivalent became 800. Then 160 g of diethanolamine and 65 g of ketiminized product of diethylenetriamine were added and reacted at 120° C. for 4 hours. After that 355 g of butyl cellosolve was added to obtain the resin No. 6 with amine value 67 and resin solid content 80%.

PREPARATION EXAMPLE 7

Blocked Polyisocyanate Crosslinking Agent

To 270 g of Cosmonate M-200 (crude MDI made by Mitsui Chemicals, Inc., trade name) 46 g of methyl isobutyl ketone was added and heated to 70° C. Then, after 281 g of diethylene glycol monoethyl ether was slowly added, it was heated to 90° C. Keeping the temperature, the disappearance of absorption of unreacted isocyanate was confirmed by infrared absorption spectrum measurement of samples taken from time to time and the blocked polyisocyanate crosslinking agent with solid content 90% was obtained.

Preparation of Clear Emulsion for Cationic Electrodeposition

After 87.5 g (70 g as resin solid content) of the resin No. 1 obtained in the above-mentioned Preparation Example 1, 33.3 g (30 g as resin solid content) of the blocked polyisocyanate crosslinking agent obtained in Preparation Example 7, 2.5 g of LSN-105 (dibutyltin dibenzoate, solid content 40%, made by Sankyo Organic Chemicals Co., Ltd., trade name) and 15 g of 10% acetic acid were mixed and stirred homogeneously, 156 g of deionized water was added dropwisely in about 15 minutes while strongly stirring to obtain the clear emulsion for cationic electrodeposition (a) with solid content 34%. In the similar manner the emulsions (b), (c), (d), and (e) were obtained from the compounding ratios as shown in the following Table 1.

Moreover, after 68.8 g (55.0 g as resin solid content) of the resin No. 6 obtained in Preparation Example 6, 33.3 g (30 g as resin solid content) of the blocked polyisocyanate crosslinking agent obtained in Preparation Example 7, 15 g of the modifier 1 obtained similarly to Preparation Example 1, 2.5 g of LSN-105 (dibutyltin dibenzoate, solid content 40%, made by Sankyo Organic Chemicals Co., Ltd.) and 15 g of 10% acetic acid were mixed and stirred homogeneously, 160 g of deionized water was added dropwisely in about 15 minutes while strongly stirring to obtain the clear emulsion for cationic electrodeposition (f) with solid content 34%.

TABLE 1

Compounding for emulsions for cationic electrodeposition

|  | Example | | | | Comparative Example | |
|---|---|---|---|---|---|---|
|  | 1 | 2 | 3 | 4 | 1 | 2 |
| Emulsion | (a) | (b) | (c) | (d) | (e) | (f) |
| Resin No. 1 | 87.5<br>−70 | | | | | |
| Resin No. 2 | | 87.5<br>−70 | | | | |
| Resin No. 3 | | | 87.5<br>−70 | | | |
| Resin No. 4 | | | | 87.5<br>−70 | | |
| Resin No. 5 | | | | | 87.5<br>−70 | |
| Resin No. 6 | | | | | | 68.8<br>−55 |
| Modifier 1 | | | | | | 15<br>−15 |
| Crosslinking agent | 33.3<br>−30 | 33.3<br>−30 | 33.3<br>−30 | 33.3<br>−30 | 33.3<br>−30 | 33.3<br>−30 |
| LSN-105 | 2.5<br>−1 | 2.5<br>−1 | 2.5<br>−1 | 2.5<br>−1 | 2.5<br>−1 | 2.5<br>−1 |
| 10% Acetic acid | 15 | 15 | 15 | 15 | 15 | 15 |
| Deionized water | 158.7 | 158.7 | 158.7 | 158.7 | 158.7 | 160 |
| 34% Emulsion | 297<br>−101 | 297<br>−101 | 297<br>−101 | 297<br>−101 | 297<br>−101 | 297<br>−101 |

Preparation of Pigment Dispersion Paste

To 5.83 parts of 60% quaternary epoxy resin chloride, 14.5 parts of titanium white, 0.4 parts of carbon black, 7.0 g of extender pigment and 2.0 parts of bismuth hydroxide, 2.24 g of deionized water was added and stirred sufficiently to obtain pigment dispersion paste with solid content 55.0%

Examples and Comparative Examples

Example 1

To 297 parts of the clear emulsion for cationic electrodeposition (a) 49.8 parts of the pigment dispersion paste and 235.7 parts of deionized water were added to obtain the cationic electrodeposition paint No. 1 with 20% solid content.

Examples 2–4 and Comparative Examples 1–2

In the same manner as Example 1 to each of the clear emulsions for cationic electrodeposition (b)-(f) the pigment dispersion paste and deionized water were added at the same compounding ratio as in Example 1 to obtain the cationic electrodeposition paints No. 2–No. 6 with 20% solid content.

Coating Test

Zinc-plated steel plate of 0.8×150×70 mm which was chemically trated wih Palbond #3080 (zinc phosphate treating agent made by Nihon Parkerizing Company, trade name) was dipped in each cationic electrodeposition paint obtained in the above-mentioned Examples and Comparative Examples, and electrodeposition coating was conducted by using the plate as cathode (coating voltage of rust preventive steel plate: 270V). The formed electrodeposition coating film was baked at 170° C. for 20 minutes by using an electric hot air drier. Performance test results of the obtained coated plates are shown in the following Table 2.

TABLE 2

| | | Test results | | | | | |
|---|---|---|---|---|---|---|---|
| | | Example | | | | Comparative Example | |
| | | 1 | 2 | 3 | 4 | 1 | 2 |
| Cationic electrodeposition paint | | No. 1 | No. 2 | No. 3 | No. 4 | No. 5 | No. 6 |
| Coating film performance | Throwing power (*1) | 65% | 63% | 65% | 63% | 45% | 55% |
| | Rust preventive steel plate aptitude (*2) | ◯ | ◯ | ◯ | ◯ | ◯ | X |
| | Corrosion resistance (*3) | ◯ | ◯ | ◯ | ◯ | ◯ | Δ |
| | Impact resistance/cm (*4) | 50< | 50< | 50< | 50< | 50< | 40 |
| | Secondary adhesive property (*5) | ◯ | ◯ | ◯ | ◯ | ◯ | Δ |
| | Bending resistance (*6) | ◯ | ◯ | ◯ | ◯ | ◯ | X |

Performance tests were conducted according to the following methods.

Figure 1:
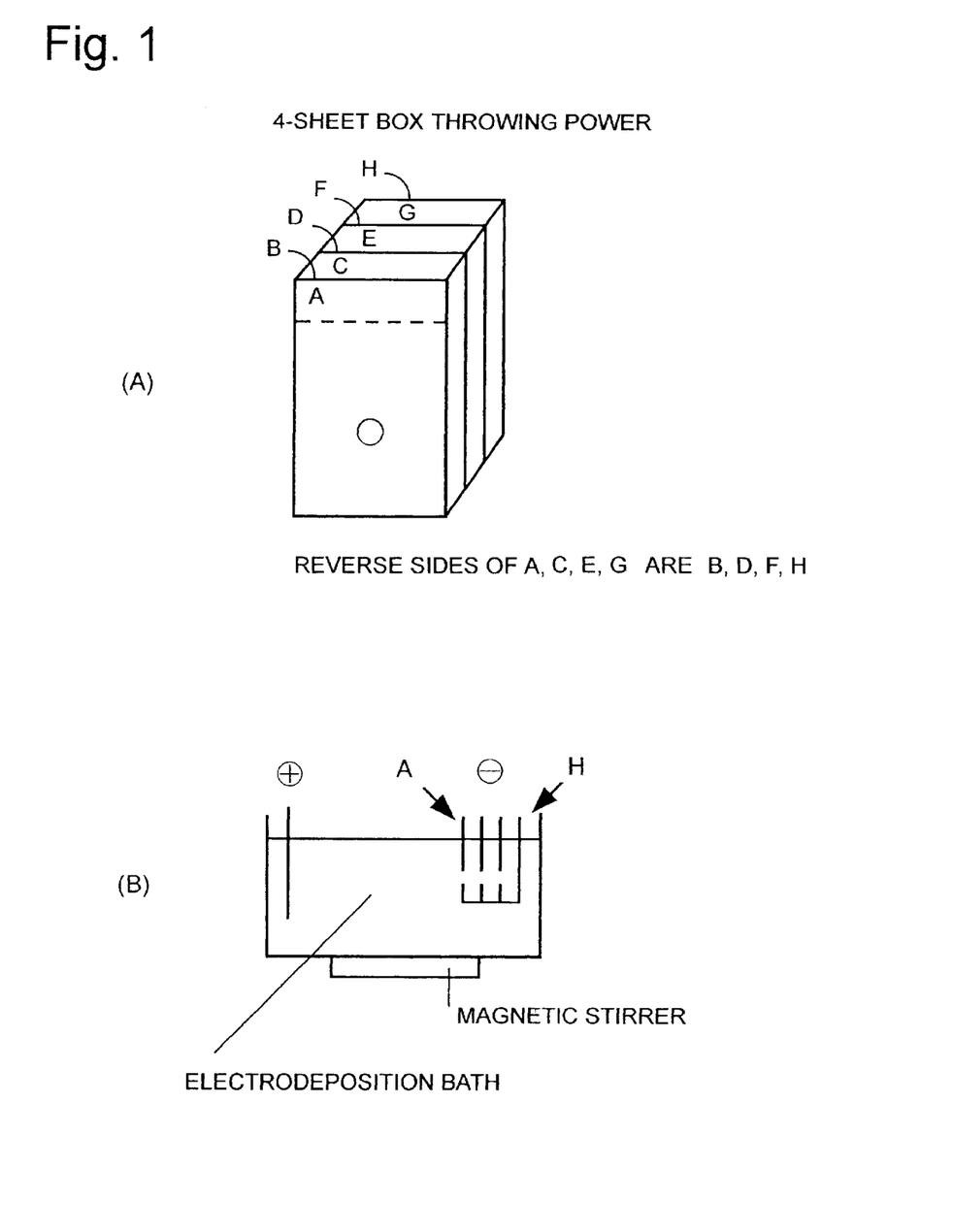

(*1) Throwing power:

By 4-sheet box method, 4 Sheets (in 3 sheets out of them have each a round hole of 8 mm diameter at a little lower from the center) of chemically treated steel plates (0.8×150×70 mm) are put together in a shape of box as shown in FIG. 1(A) (distance between each plate: 20 mm) and clipped in the electrodeposition bath as shown in FIG. 1(B). Electrodeposition coating is conducted under the above-mentioned condition. The surface AH is supposed to be an outer panel of a car body and the surface FG is supposed to be a baggy part of a car body. Throwing power is evaluated by film thickness of the surface FG/film thickness of the surface AH (%).

(*2) Rust preventive steel plate aptitude:

Number of pinholes is counted in 10×10 cm of the test piece of zinc-plated steel plate which was dipped in an electrodeposition bath as cathode and coated under the voltage of 270V at the bath temperature of 28° C.

◯: No pinhole generates

Δ: 3–5 pinholes generate.

X: More than 10 pinholes generate.

(*3) Corrosion resistance:

Cross-cut lines are cut in the electrodeposition coating film on each electrodeposition coated plate, obtained by baking at 170° C. for 20 minutes, with a knife reaching to the ground surface, to which salt water spray tests according to JIS Z-2371 were conducted for 840 hours and evaluated by the rust and blister width from the knife scratch according to the following standard.

◯: Maximum width of rust or blister is less than 2 mm from the cut part (one side).

Δ: Maximum width of rust or blister is more than 2 mm and less than 3 mm from the cut part (one side) and blistering is observed all over the coated surface.

X : Maximum width of rust or blister is more than 3 mm from the cut part and blistering is observed all over the coated surface.

(*4) Impace resistance (Dupont method):

After keeping the test plate obtained by baking at 170° C. for 20 minutes in a room of constant temperature and humidity of the temperature 20±1° C. and the humidity of 75±2% for 24 hours, a stand and an impact point of the prescribed size are equipped to a Dupont impact test machine and the test plate is inserted beteen them with the coated side up. Then a weight of the prescribed weight is fallen onto the impact point and the maximum height provoking no cracking or chipping of the coating film by impact is measured.

(*5) Secondary adhesive property:

On the coated surface of the coated plate obtained by the aforementioned coating test TP-37 Grey (aminoalkyd type intermediate paint made by Kansai Paint Co., Ltd., trade name) and NEO AMILAC 6000 (aminoalkyd type topcoat paint made by Kansai Paint Co., Ltd., trade name) are further coated successively. The baked and cured coated plate is soaked in warm water of 40° C. for 240 hours and, after making 2 mm square check cuts on it, the remaining ratio (number of remained pieces/100) of the coating film at an adhesive tape peeling test is evaluated.

◯: 100/100

Δ: 90–99/100

X: less than 89/100

(*6) Bending resistance:

After keeping the test plate in a room of constant temperature and humidity of the temperature 20±1° C. and the humidity of 75±2% for 24 hours, the test plate is bent to 180° in 1–2 seconds.

◯: No abnormality is observed at both surfaces at the bent part

X: Abnormality such as cracking, chipping etc. is observed at least at either side.

What is claimed is:

1. A cationic paint composition containing as resin component a polyol-modified amino group-containing epoxy resin obtained by reacting (a) 60–85% by weight of an epoxy resin with an epoxy equivalent of 180–2,500 with (b) 0.5–15% by weight of an acid compound selected from the group consisting of the phenols of the following formula (1) and the carboxylic acids of the following formula (2), wherein, X represents a hydrogen atom or a hydrocarbon group with a carbon atom number 1–15 which may have optionally substituents selected from the group consisting of —OH, —OR, —SH and —SR, and Y represents a hydrocarbon group with a carbon atom number 1–15 which may have optionally substituents selected from the group consisting of —OH, —OR, —SH and —SR, wherein R represents an alkyl group, (c) 5–20% by weight of a polyol compound obtained by adding a caprolactone ($c_2$) to a compound ($c_1$) containing a plurality of active hydrogen groups, and (d) 5–25% by weight of an amino group-containing compound, the weight ratios being based upon the total solid content weight of the epoxy resin (a), acid compound (b), polyol compound (c) and amino group-containing compound (d).

2. A cationic paint composition set forth in claim 1 wherein the epoxy resin (a) is obtained by reacting a polyphenol compound and an epihalohydrin.

3. A cationic paint composition as set forth in claim 2 wherein the compound ($c_1$) containing a plurality of active hydrogen groups is selected from the group consisting of ethylene glycol, propylene glycol, 1,4-butanediol, 1,6-hexanediol, diethylene glycol, hydrogenated bisphenol A, glycerol, trimethylolethane, trimethylolpropane, pentaerythritol, dipentaerythritol, polyethylene glycol, polypropylene glycol, polytetramethylene glycol, poly (ethylene/propylene)glycol, bisphenol A polyethylene glycol ether, bisphenol A polypropylene glycol ether, butylenediamine, hexamethylenediamine, monoethanolamine, diethanolamine, triethanolamine, isophoronediamine, ethylenediamine, propylenediamine, diethylenetriamine and triethylenetetramine.

4. A cationic paint composition set forth in claim 2 wherein the polyphenol compound is bisphenol A.

5. A cationic paint composition as set forth in claim 4 wherein the compound ($c_1$) containing a plurality of active hydrogen groups is selected from the group consisting of ethylene glycol, propylene glycol, 1,4-butanediol, 1,6-hexanediol, diethylene glycol, hydrogenated bisphenol A, glycerol, trimethylolethane, trimethylolpropane, pentaerythritol, dipentaerythritol, polyethylene glycol, polypropylene glycol, polytetramethylene glycol, poly (ethylene/propylene)glycol, bisphenol A polyethylene glycol ether, bisphenol A polypropylene glycol ether, butylenediamine, hexamethylenediamine, monoethanolamine, diethanolamine, triethanolamine, isophoronediamine, ethylenediamine, propylenediamine, diethylenetriamine and triethylenetetramine.

6. A cationic paint composition set forth in claim 1 wherein the epoxy resin (a) has an epoxy equivalent in the range of 200–2,000.

7. A cationic paint composition as set forth in claim 6 wherein the compound ($c_1$) containing a plurality of active hydrogen groups is selected from the group consisting of ethylene glycol, propylene glycol, 1,4-butanediol, 1,6-hexanediol, diethylene glycol, hydrogenated bisphenol A, glycerol, trimethylolethane, trimethylolpropane, pentaerythritol, dipentaerythritol, polyethylene glycol, polypropylene glycol, polytetramethylene glycol, poly (ethylene/propylene)glycol, bisphenol A polyethylene glycol ether, bisphenol A polypropylene glycol ether, butylenediamine, hexamethylenediamine, monoethanolamine, diethanolamine, triethanolamine, isophoronediamine, ethylenediamine, propylenediamine, diethylenetriamine and triethylenetetramine.

8. A cationic paint composition set forth in claim 1 wherein a phenol of the formula (1) as the acid compound (b) is an alkylphenol.

9. A cationic paint composition as set forth in claim 8 wherein the compound ($c_1$) containing a plurality of active hydrogen groups is selected from the group consisting of ethylene glycol, propylene glycol, 1,4-butanediol, 1,6-hexanediol, diethylene glycol, hydrogenated bisphenol A, glycerol, trimethylolethane, trimethylolpropane, pentaerythritol, dipentaerythritol, polyethylene glycol, polypropylene glycol, polytetramethylene glycol, poly (ethylene/propylene)glycol, bisphenol A polyethylene glycol ether, bisphenol A polypropylene glycol ether, butylenediamine, hexamethylenediamine, monoethanolamine, diethanolamine, triethanolamine, isophoronediamine, ethylenediamine, propylenediamine, diethylenetriamine and triethylenetetramine.

10. A cationic paint composition set forth in claim 1 wherein a carboxylic acid of the formula (2) as the acid compound (b) is selected from the group consisting of acetic acid, propionic acid, butyric acid, oleic acid, dimethylolpropionic acid, dimethylolbutyric acid, dimethylolvaleric acid and benzoic acid.

11. A cationic paint composition as set forth in claim 10 wherein the compound ($c_1$) containing a plurality of active hydrogen groups is selected from the group consisting of ethylene glycol, propylene glycol, 1,4-butanediol, 1,6-hexanediol, diethylene glycol, hydrogenated bisphenol A, glycerol, trimethylolethane, trimethyloipropane, pentaerythritol, dipentaerythritol, polyethylene glycol, polypropylene glycol, polytetramethylene glycol, poly (ethylene/propylene)glycol, bisphenol A polyethylene glycol ether, bisphenol A polypropylene glycol ether, butylenediamine, hexamethylenediamine, monoethanolamine, diethanolamine, triethanolamine, isophoronediamine, ethylenediamine, propylenediamine, diethylenetriamine and triethylenetetramine.

12. A cationic paint composition as set forth in claim 1 wherein an active hydrogen group in the compound ($c_1$) containing a plurality of active hydrogen groups is selected from the group consisting of alcoholic hydroxyl group, primary amino group and secondary amino group.

13. A cationic paint composition as set forth in claim 12 wherein the compound ($c_1$) containing a plurality of active hydrogen groups is selected from the group consisting of ethylene glycol, propylene glycol, 1,4-butanediol, 1,6-hexanediol, diethylene glycol, hydrogenated bisphenol A, glycerol, trimethylolethane, trimethylolpropane, pentaerythritol, dipentaerythritol, polyethylene glycol, polypropylene glycol, polytetramethylene glycol, poly (ethylene/propylene)glycol, bisphenol A polyethylene glycol ether, bisphenol A polypropylene glycol ether, butylenediamine, hexamethylenediamine, monoethanolamine, diethanolamine, triethanolamine, isophoronediamine, ethylenediamine, propylenediamine, diethylenetriamine and triethylenetetramine.

14. A cationic paint composition set forth in claim 1 wherein the compound ($c_1$) containing a plurality of active hydrogen groups is selected from the group consisting of low molecular weight polyols, linear or branched polyether polyols, linear or branched polyester polyols, amine compounds containing primary and/or secondary amino group and hydroxyamine compounds containing primary and/or secondary amino group and hydroxyl group.

15. A cationic paint composition as set forth in claim 14 wherein the compound ($c_1$) containing a plurality of active hydrogen groups is selected from the group consisting of ethylene glycol, propylene glycol, 1,4-butanediol, 1,6-hexanediol, diethylene glycol, hydrogenated bisphenol A, glycerol, trimethylolethane, trimethylolpropane, pentaerythritol, dipentaerythritol, polyethylene glycol, polypropylene glycol, polytetramethylene glycol, poly(ethylene/propylene)glycol, bisphenol A polyethylene glycol ether, bisphenol A polypropylene glycol ether, butylenediamine, hexamethylenediamine, monoethanolamine, diethanolamine, triethanolamine, isophoronediamine, ethylenediamine, propylenediamine, diethylenetriamine and triethylenetetramine.

16. A cationic paint composition set forth in claim 1 wherein the compound ($c_1$) containing a plurality of active hydrogen groups has a number-average molecular weight in the range of 62–5,000.

17. A cationic paint composition set forth in claim 1 wherein the compound ($c_1$) containing a plurality of active hydrogen groups contains in average at least 2 and less than 30 active hydrogen groups in the molecule.

18. A cationic paint composition as set forth in claim 1 wherein the compound ($c_1$) containing a plurality of active hydrogen groups is selected from the group consisting of ethylene glycol, propylene glycol, 1,4-butanediol, 1,6-hexanediol, diethylene glycol, hydrogenated bisphenol A, glycerol, trimethylolethane, trimethylolpropane, pentaerythritol, dipentaerythritol, polyethylene glycol, polypropylene glycol, polytetramethylene glycol, poly(ethylene/propylene)glycol, bisphenol A polyethylene glycol ether, bisphenol A polypropylene glycol ether, butylenediamine, hexamethylenediamine, monoethanolamine, diethanolamine, triethanolamine, isophoronediamine, ethylenediamine, propylenediamine, diethylenetriamine and triethylenetetramine.

19. A cationic paint composition set forth in claim 1 wherein the caprolactone ($c_2$) is ε-caprolactone.

20. A cationic paint composition set forth in claim 1 wherein the addition mole amount of a caprolactone ($c_2$) to a compound ($c_1$) containing a plurality of active hydrogen groups is in the range of 1–30 moles to 1 equivalent of said active hydrogen group.

21. A cationic paint composition set forth in claim 1 wherein the polyol-modified amino group-containing epoxy resin is obtained by reacting an epoxy resin (a) and an acid compound (b) first and then reacting a polyol compound (c) and an amino group-containing compound (d) to the reaction product at the same time.

22. A cationic paint composition set forth in claim 1 wherein the polyol-modified amino group-containing epoxy resin is obtained by reacting 62–83% by weight of an epoxy resin (a), 1–10% by weight of an acid compound (b), 5–18% by weight of a polyol compound (c) and 6–19% by weight of an amino group-containing compound (d) based upon the total solid content weight of the epoxy resin (a), acid compound (b), polyol compound (c) and amino group-containing compound (d).

23. A cationic paint composition set forth in claim 1 wherein the polyol-modified amino group-containing epoxy resin has an amine value in the range of 30–50 mgKOH/g.

24. A cationic paint composition set forth in claim 1 which further contains blocked polyisocyanate crosslinking agent.

25. A cationic paint composition set forth in claim 24 which contains blocked polyisocyanate crosslinking agent in the range of 10–45% by weight based upon the total solid content weight of the polyol-modified amino group-containing epoxy resin and blocked polyisocyanate crosslinking agent.

26. A cationic paint composition set forth in claim 1 which further contains bismuth compound as anticorrosive agent.

27. A cationic electrodeposition bath comprising the cationic paint composition set forth in claim 1.

28. A method for coating which comprises cationically electrodepositing the cationic paint composition set forth in claim 1 on a surface of a substrate.

29. An article coated by using the cationic paint composition set forth in claim 1.

* * * * *